E. P. COWLES.
MOTOR VEHICLE.
APPLICATION FILED APR. 3, 1914.

1,165,496.

Patented Dec. 28, 1915.
4 SHEETS—SHEET 3.

Witnesses
G. H. Baker.
B. M. Kent.

Inventor
Edward P. Cowles
by Foster Freeman Watson & Coit
Attorneys

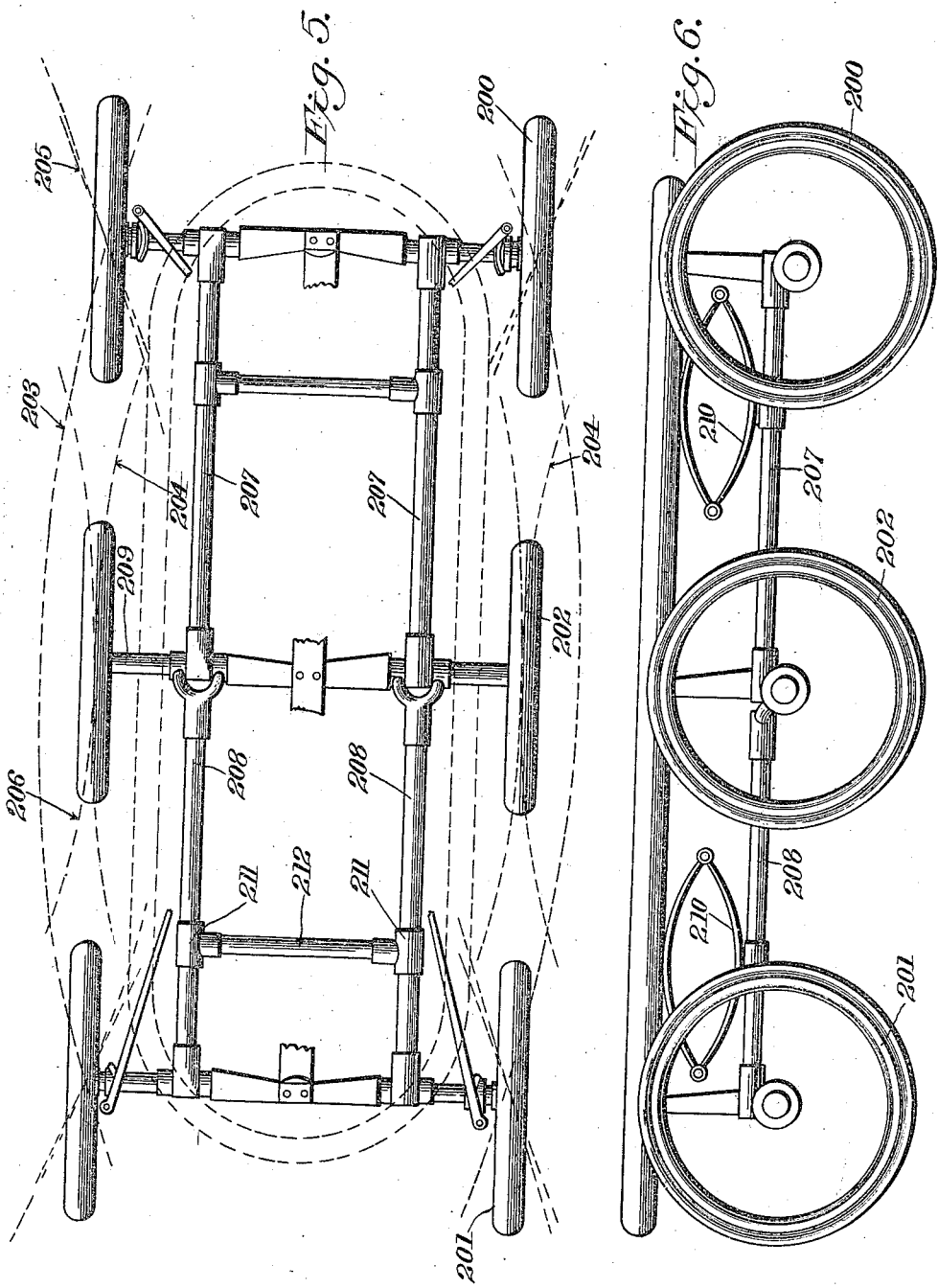

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

MOTOR-VEHICLE.

1,165,496. Specification of Letters Patent. Patented Dec. 28, 1915.

Original application filed September 6, 1901, Serial No. 74,497. Divided and application filed August 9, 1912, Serial No. 714,297. Divided and this application filed April 3, 1914. Serial No. 829,319.

*To all whom it may concern:*

Be it known that I, EDWARD P. COWLES, a citizen of the United States, residing at Sparta, in the county of Kent and State of Michigan, have invented certain new and useful Improvements in Motor-Vehicles, of which the following is a specification.

This application is a division of my application Serial No. 714,297, filed August 9, 1912, which in turn is a division of my earlier application filed September 6th, 1901, and issued January 21, 1913, Patent No. 1,050,810.

My present invention relates to improvements in motor vehicles and particularly to the running gear and steering mechanism of such vehicles.

One of the objects of the invention is to provide a steering mechanism for four wheels of a four or six wheel vehicle.

With this and other objects in view, one embodiment of the invention consists in the construction and arrangement of parts described in the following specification, reference being had to the accompanying drawings, in which:—

Figure 1:
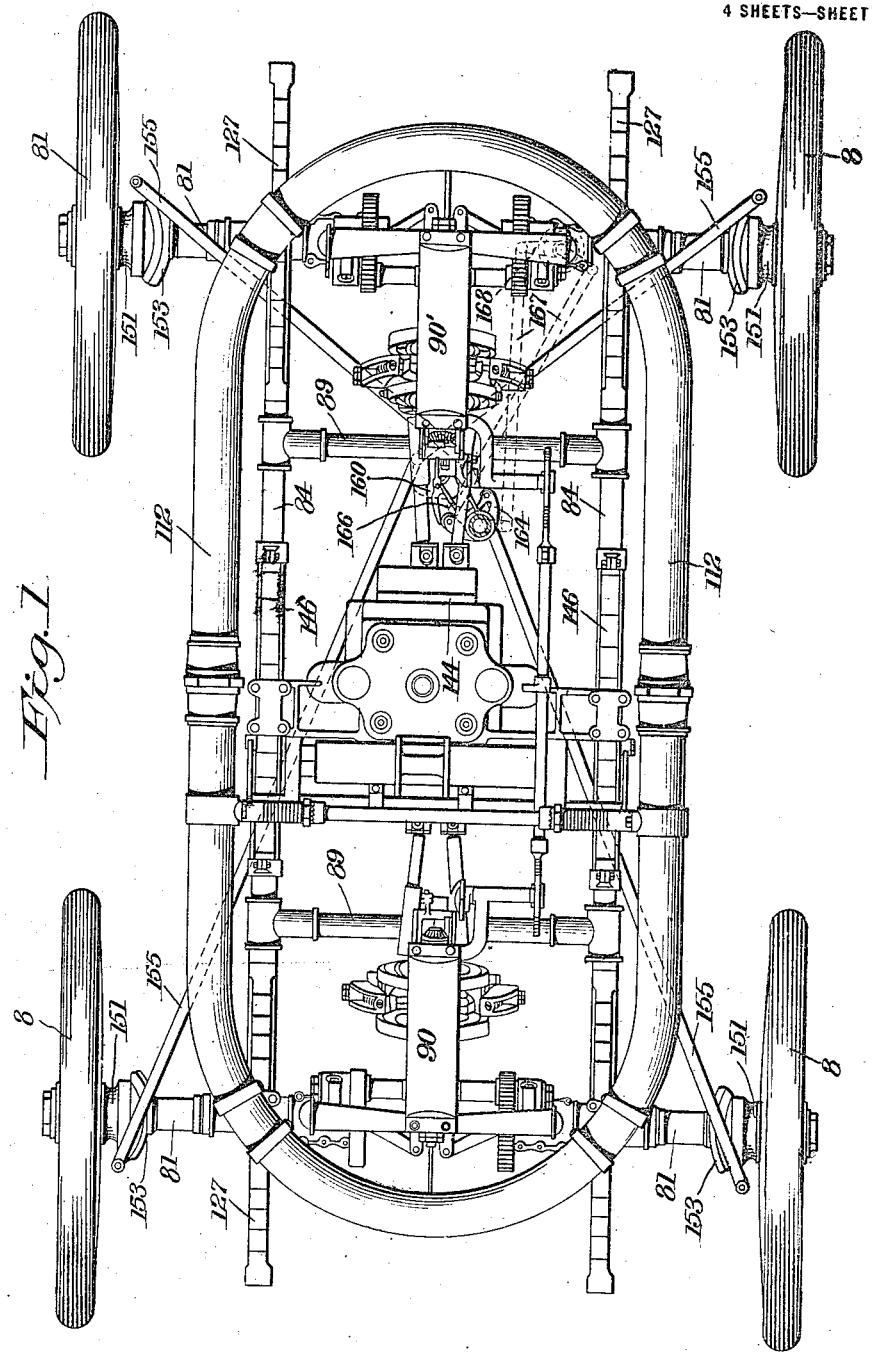
Figure 2:
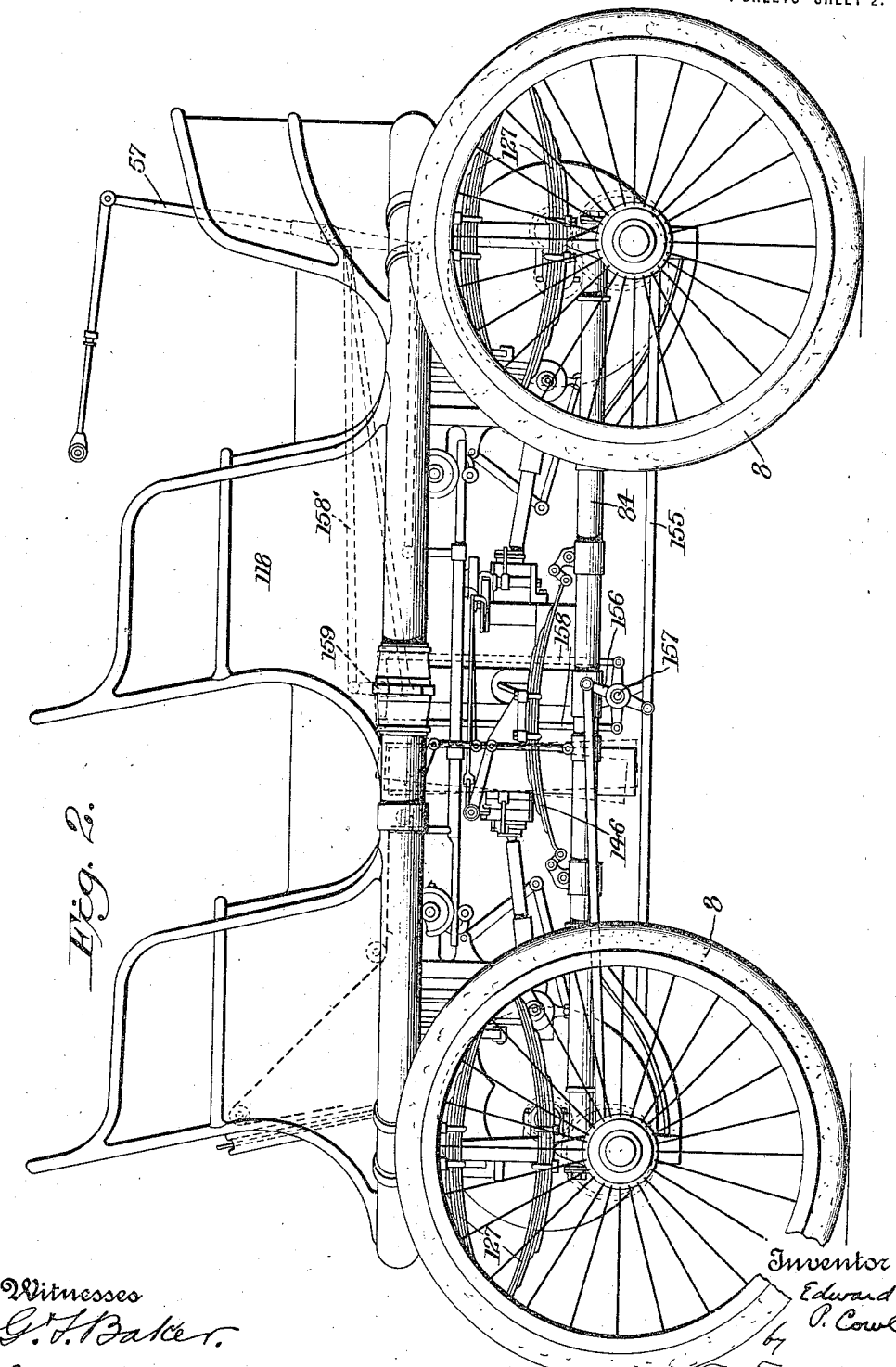
Figure 3:
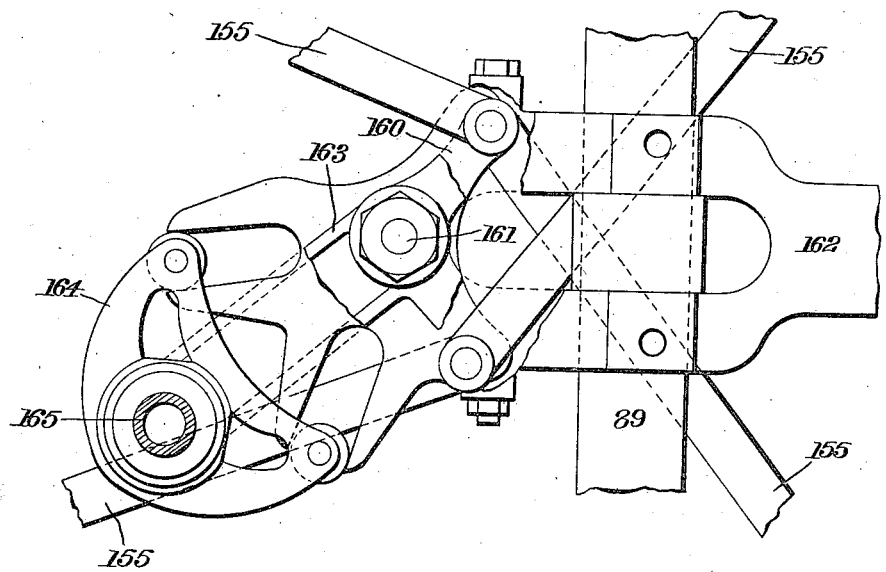
Figure 4:
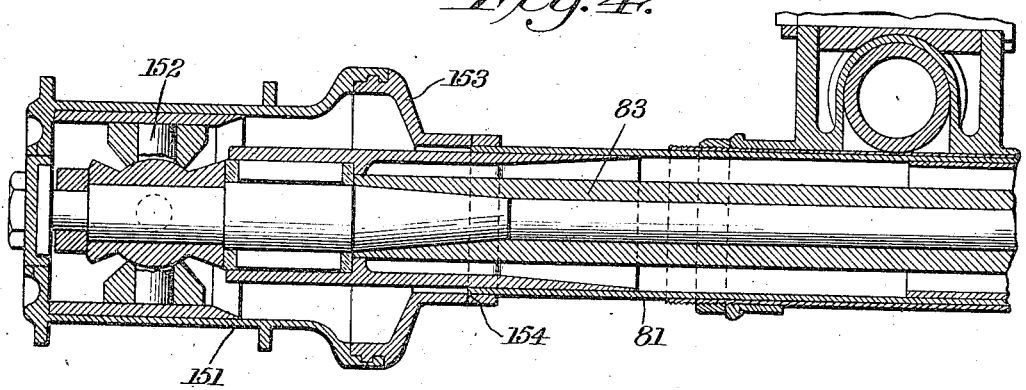

Figure 1 is a plan view of a motor vehicle embodying my invention, the body of the vehicle being removed; Fig. 2 is a side elevation of the vehicle shown in Fig. 1, parts of the invention being shown in slightly different form; Fig. 3 is an enlarged plan view of a portion of the steering mechanism; Fig. 4 is a vertical section through one of the axles adapted for both steering and driving; and Fig. 5 is a plan view, and Fig. 6 a side view, of a six wheel vehicle adapted for four wheel steering.

While my invention is applicable to all kinds of motor vehicles and to all kinds of motors, it is specially adapted to that form of driving gear shown and described in my Patent No. 654,716, dated July 31, 1900, and the driving gear outlined in the accompanying drawings is of that form.

Referring to the drawings, Figs. 1 and 2, the vehicle wheels are shown at 8 supporting the axles 81 which are connected by a frame comprising side bars 84 forming reach rods, and cross bars 89. Upon this frame, the motor 144 is supported on springs 146 in any suitable manner. Supported on the axles and to cross pieces 89 are the differential and variable speed gearing 90 and 90' for driving the axle sections 83 (Fig. 4) arranged within the tubular axles 81. Suitable driving shafts also connect the motor with the gearings 90 and 90'.

Springs 127, two on each axle, support the body frame 112 upon which is mounted the body 118. A steering shaft 57 is suitably supported on the body and is connected to the wheels 8 for turning them simultaneously so that the revolving planes of the wheels upon the same side of the vehicle will be tangential to the same circle, as will be hereinafter more fully described.

Referring particularly to Figs. 1 and 4, the hub 151 of the wheel 8 consists of a tubular body to which the driving axle 83 is attached by a universal joint 152 arranged in the central plane of revolution of the wheel and permitting the latter while receiving the rotating power of the driving axle 83, to oscillate freely in every direction. The inner end of the tubular body of the hub 151 engages with a sway block 153 having a horizontal slot 154, sliding on the axle. This holds the wheel rigidly upright, while allowing it to oscillate to conform to the direction of motion of the vehicle.

It will be understood that each of the four wheels 8 are connected to the axles as above described, and the sway blocks 153 are simultaneously adjusted horizontally to turn the wheels to steer the vehicle by means of steering rods 155 which are also connected to a centrally located horizontal wrist plate 160, Figs. 1 and 3, having a bearing 161 in an extension of the brace 162 of the front driving gear 90'. Wrist plate 160 is oscillated by a cam plate 163, attached to the same shaft with it, which in turn is operated by a double cam 164, having a ball and socket bearing in the same support with cam plate 163 and wrist plate 160. Double cam 164 is oscillated by an extensible shaft 165, extending up into the body, to which it is connected by ball and socket joint. On the upper end of this shaft are cross arms 166, connected by links 167, shown by broken lines on Fig. 1, to similar cross arms 168 of the universal joint of the steering lever 57 hereinbefore described. As it is necessary to reverse the motion between the steering lever 57 and upright shaft 165 the links 167 are crossed as shown.

The above described arrangement gives to the four wheeled steering mechanism, the advantages of a sensitive and automatically locked movement in all maneuvering required in steering on ordinary straight roads, and accelerated as it approaches extreme swing right or left. Cam plate 163, double cam 164, and extensible shaft 165, are substantially the same, operate in the same way, and for the same purpose, as cam plate 38, double cam 37, and shaft 49, in connection with a vehicle in which the front wheels only are employed for steering, and described in another divisional application Serial No. 714,297.

There are special advantages in driving all four wheels where soft tires are used, as beyond a certain limit the tractive strain on such tires, especially pneumatic tires, is so destructive, that it is impracticable to drive with two wheels for a load of more than four or five persons. Where all four wheels are driven this destructive effect is no greater for a load of eight or ten persons. Another important advantage in a "double" or four wheel drive, where all four wheels are steered as shown and specified, is that the rear wheels always follow the track of the front wheels. In moving forward or backward, turning either to right or left, it is impossible for the rear wheels to get out of the track of those in front. If the front wheels clear an obstruction, the driver knows that the rear wheels will clear also and need give them no concern.

In the form of the invention shown in Fig. 2, the rods 155 are connected to arms 156 on a transversely extending rock shaft 157 connected by parallel links 158 to a second rock shaft 159. The latter rock shaft is oscillated by the steering shaft 57 through link 158' connected to the steering shaft similarly to the links 167 of the form shown in Fig. 1.

In Figs. 5 and 6 is shown a vehicle frame having six wheels to each of which power may be applied and which may be guided perfectly by utilizing the steering mechanism illustrated in the other figures for the purpose of deflecting two pairs of wheels, preferably the front and rear wheels simultaneously in opposite directions. The front wheels 200 and the rear wheels 201 are steering wheels, and are deflected by the steering lever in the manner hereinbefore described to steer the vehicle. The centrally located pair of wheels 202 are not steering wheels and always remain in the same planes relatively to the body. When the steering wheels are deflected to steer the vehicle to the right, said wheels will follow one another in circles such as that indicated by 203, while the central wheels will turn as on pivots following concentric circles 204. The dotted lines 205 and 206 indicate the circular paths of the wheels when the steering lever is reversed. In this arrangement it is necessary to pivot the frame at the central axle to provide for unevenness in the road. To this end the reaches 207 and 208 are separately journaled with T-joints on the central axle 209, which permits any individual axle to move vertically and yet maintains the axles rigidly against lateral movement. The springs 210 are preferably mounted upon the T's 211, which are arranged about two-thirds of the distance from the central axle to the end axles, and carry the cross bars 212. Parts of the steering mechanism are omitted from these views for the purpose of clearness.

Having thus described my invention, what I claim is:

1. In a motor vehicle, the combination of a laterally-rigid frame flexible in its horizontal plane, a pair of independently pivoted steering wheels at each end of said frame, connections for turning said pairs of wheels simultaneously to steer the vehicle, and a pair of wheels arranged at the center of the frame, whose planes are in a fixed relation to the frame.

2. In a motor vehicle, a frame comprising a front axle, a rear axle, and a central axle, reaches rigidly connected to said front and rear axles and hinged upon the central axle and adapted to hold all of said axles in substantially parallel relation, in combination with steering wheels upon the forward and rear axles, mechanism for turning said steering wheels simultaneously so that the wheels upon the same side of the vehicle will be tangential to the same circle, and wheels upon the central axle whose planes of rotation are in fixed relation to the frame.

3. In a motor vehicle, a frame comprising a forward axle, a rear axle, and a central axle, reaches rigidly connected to said forward and rear axles and hinged upon the central axle, in combination with steering wheels upon the forward and rear axles, mechanism for turning said steering wheels simultaneously so that the wheels upon the same side of the vehicle will be tangential to the same circle, and wheels upon the central axle whose planes of rotation are in fixed relation to the frame, a vehicle body and springs for supporting said body arranged upon the frame at points approximately two-thirds the distance from the center axle to the front and rear axles.

4. In a motor vehicle, the combination of a pair of axles held against swinging movement, combined steering and driving wheels pivotally connected at the ends of said axles, differential gearing carried by each axle and operatively connected with the wheels thereon, a motor on the vehicle supported flexibly relatively to said axles and with its axis arranged longitudinally of the vehicle, means for driving said differential gearings from the motor including universally jointed driving shafts arranged longitudinally of the vehicle and one of which shafts is geared to the motor shaft, and steering mechanism arranged to turn said wheels on their pivotal connections.

5. In a motor vehicle, the combination of a pair of tubular axles held against swinging movement, combined steering and driving wheels pivotally connected at the ends of one of said axles, driving wheels mounted at the ends of the other of said axles, differential gearing carried by each axles and operatively connected with the wheels thereon by shafts in the tubular axles, a motor on the vehicle supported flexibly relatively to said axles and with its axis arranged longitudinally of the vehicle, means for driving said differential gearings from the motor including universally jointed driving shafts arranged longitudinally of the vehicle and one of which shafts is geared to the motor shaft, and steering mechanism arranged to turn said combined steering and driving wheels on their pivotal connections.

In testimony whereof I affix my signature in presence of two witnesses.

EDWARD P. COWLES

Witnesses.
A. B. CHENEY,
S. M. BALLARD.

Copies of this patent may be obtained for five cents each, by addressing the "Commissioner of Patents, Washington, D. C."